United States Patent
Cartigny et al.

(10) Patent No.: US 7,322,279 B2
(45) Date of Patent: Jan. 29, 2008

(54) LID FOR PRESSURE COOKING VESSEL WITH LIGHTENED JAWS AND COOKING APPARATUS COMPRISING

(75) Inventors: Michel Pierre Cartigny, Mirebeau sur Beze (FR); Yvan Marcel Georges Piguet, Cusey (FR); Eric Christian Jacques Rhetat, Dijon (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 10/499,229

(22) PCT Filed: Dec. 18, 2002

(86) PCT No.: PCT/FR02/04425

§ 371 (c)(1),
(2), (4) Date: Jul. 7, 2005

(87) PCT Pub. No.: WO03/051163

PCT Pub. Date: Jun. 26, 2003

(65) Prior Publication Data
US 2005/0235835 A1 Oct. 27, 2005

(30) Foreign Application Priority Data
Dec. 19, 2001 (FR) ................... 01 16902

(51) Int. Cl.
*A47J 37/00* (2006.01)
(52) U.S. Cl. ............. 99/337; 99/403; 220/316
(58) Field of Classification Search ............ 99/330, 99/331, 337, 338, 340, 339, 342, 403–418; 220/314, 316, 912; 126/20, 369
See application file for complete search history.

(56) References Cited

U.S. PATENT DOCUMENTS

| 5,370,259 | A |   | 12/1994 | Cartigny ............... 220/316 |
| 5,613,424 | A | * | 3/1997  | Chameroy et al. ....... 99/337  |
| 5,678,721 | A | * | 10/1997 | Cartigny et al. ........ 220/316 |
| 6,019,029 | A | * | 2/2000  | Chan .................. 99/337  |
| 6,116,151 | A |   | 9/2000  | Fickert et al. ......... 99/337 |

FOREIGN PATENT DOCUMENTS

| EP | 0 691 096 A1 | 1/1996 |
| EP | 0 691 097 A1 | 1/1996 |
| FR | 1142648      | 2/1956 |
| WO | WO 03/051163 | 6/2003 |

* cited by examiner

*Primary Examiner*—Timothy F. Simone
(74) *Attorney, Agent, or Firm*—James W. Kayden; Thomas, Kayden, Horsteyemer & Risley, LLP

(57) ABSTRACT

The present application relates to a lid (4) for a pressure cooking appliance (1) the lid designed to be placed and locked on a cooking vessel (2). The lid (4) comprises at least one jaw (5) mounted to move radially between a locking position and unlocking position. Said at least one jaw (5) is substantially of channel section, with a top face (10) for bearing on the lid (4), a front face (11), and a folded-under bottom face (12) designed, when in the locking position, to come into contact with the underside of a rim (3) of the cooking vessel (2). The at least one jaw (5) includes a substantially central setback (15) extending in the front and bottom faces (11, 12) thereof so as to define two locking wings (16, 17). The invention also provides a pressure cooking appliance fitted with the lid (4).

12 Claims, 2 Drawing Sheets

US 7,322,279 B2

LID FOR PRESSURE COOKING VESSEL WITH LIGHTENED JAWS AND COOKING APPARATUS COMPRISING

CROSS-REFERENCE TO RELATED APPLICATIONS

This application is a national stage application of International Application No. PCT/FR02/04425, filed Dec. 18, 2002, which claims priority to FR 01/16902, filed Dec. 19, 2001, both applications of which are hereby incorporated by reference in their entirety into the present application.

TECHNICAL FIELD

The present invention relates to the technical field of pressure cooking appliances, such as pressure cookers, having a lid for placing and locking on a cooking vessel, said lid having at least one jaw mounted to move radially between a locking position and an unlocking position on said lid.

The present invention relates to a lid for a pressure cooking appliance, the lid being for placing and locking on a cooking vessel, said lid having at least one jaw mounted to move radially between a locking position and an unlocking position, said at least one jaw being substantially of channel section, with a top face bearing on the lid, a front face, and a bottom face folded under and designed, when in the locking position, to come into contact with the underside of the rim of the vessel.

The present invention also provides a pressure cooking appliance of the pressure cooker kind, fitted with a lid having at least one locking jaw mounted to move radially on said lid under drive from a control member.

PRIOR ART

Pressure cooking appliances, such as pressure cookers, are already known for cooking food under pressure, and they include a lid having two jaws mounted to move radially thereon in opposite positions, said lid being designed to be placed or positioned on the cooking vessel of the pressure cooker, and then locked by means of a control device for moving the jaws that are positioned on the lid radially. Such a device is described, for example, in patent applications EP-0 691 096 and EP-0 691 097 in the name of the same Applicant.

Those known devices use at least two locking jaws secured to drive arms, e.g. disposed radially on the lid, with displacement thereof being controlled by a central control member on the lid such as a button, a knob, or the like, which the user actuates so as to move the jaws radially either outwards or else inwards in order to position the jaws respectively in an unlocking position or in a locking position.

In those prior art devices, the jaws are in the form of pieces having a radius of curvature that matches the diameter of the cooking vessel of the appliance and having a defined length (e.g. one-fourth of the circumference of the vessel), each of said pieces being substantially of channel section, with a top face bearing on the lid, a front face, and a bottom face folded under and designed, when in the locking position, to come into contact with the underside of the rim of the vessel.

Those known systems give full satisfaction and are easy for the user to manipulate, in particular in order to reach the locking and unlocking positions, while still being robust and particularly reliable in terms of providing safety against excess pressure.

However, although jaws of the above-mentioned type are indeed robust, they suffer from a major drawback associated with their special and difficult method of manufacture.

Those jaws are made by stamping pieces of metal, and obtaining accurate dimensions for the various faces of the channel sections of the jaws, while ensuring that the pieces present good appearance, since these pieces are directly visible on the outside of the cooking appliance, require numerous industrial finishing steps to be performed. In particular, stamping operations lead to zones of extra thickness in the metal material, and also to zones of degraded appearance (scratches, dents, hammered zones, etc.) which need specifically to be corrected during subsequent manual finishing steps, e.g. by polishing.

Such additional finishing operations give rise to additional industrial cost for the jaws that are produced, which constitutes a drawback that is not negligible.

Furthermore, it turns out that those jaws are made robust in particular by using jaws of thickness and other dimensions that are considerable, implying that a corresponding amount of material needs to be used, and that also contributes to increasing the economic cost of the jaws that are produced.

SUMMARY OF THE INVENTION

Consequently, the objects given to the invention seek to remedy the various drawbacks listed above and to propose a novel lid for a pressure cooking appliance fitted with locking/unlocking jaws mounted to move radially on the lid, said lid and said jaws being particularly easy and inexpensive to make, while also providing improved mechanical strength.

Another object of the invention seeks to propose a novel lid for a pressure cooking appliance suitable for controlling and mastering effectively any deformations to which the lid might be subjected in the event of accidental excess pressure inside the appliance.

Another object of the invention is to propose a novel lid for a pressurized appliance in which the jaws are particularly adapted to being manufactured by folding operations, without thereby weakening the overall strength of the jaw.

Another object of the invention is to provide a novel lid for a pressure cooking appliance in which the jaws are shaped to provide good resistance to deformation in the event of accidental excess pressure.

Another object of the invention is to propose a novel lid for a pressure cooking appliance which is particularly light in weight, while also being strong.

The objects given to the invention are achieved by a lid for a pressure cooking appliance the lid being for placing and locking on a cooking vessel, said lid having at least one jaw mounted to move radially between a locking position and unlocking position, said at least one jaw being substantially of channel section with a top face for bearing on the lid, a front face, and a folded-under bottom face designed, when in the locking position, to come into contact with the underside of the rim of the vessel, the lid being characterized in that said at least one jaw includes a substantially central setback extending in the front and bottom faces thereof so as to define two locking wings.

BRIEF DESCRIPTION OF THE DRAWINGS

Other features and advantages of the invention will better understood in the light of the following description and the accompanying drawings, given purely by way of non-limiting illustration, and in which.

BEST MANNER OF PERFORMING THE INVENTION

Figure 4:
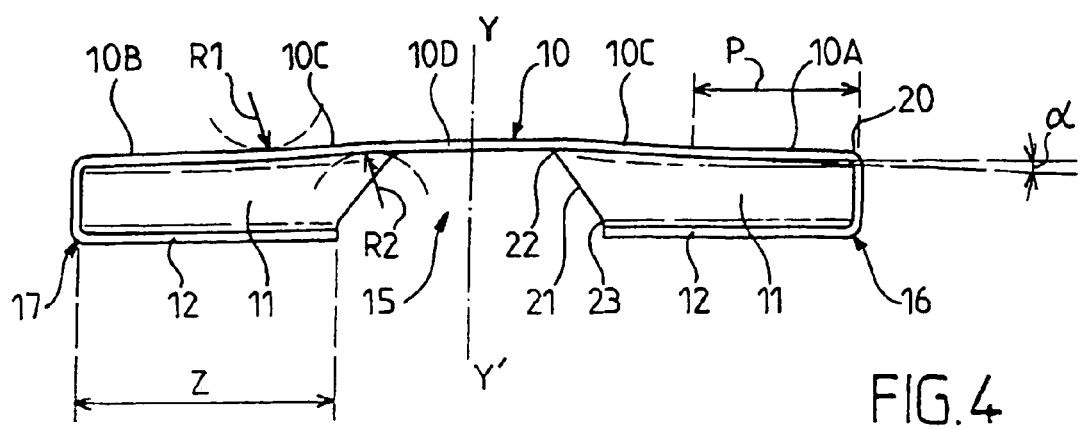
FIG. 4 is a side view of an implementation detail of a locking jaw in accordance with the invention.
Figure 5:
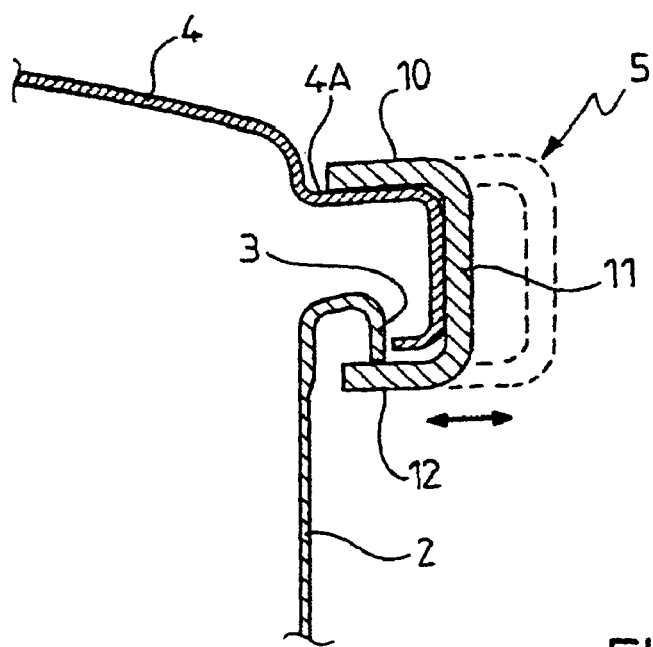
FIG. 5 is a fragmentary cross-section view showing a pressure cooker in accordance with the invention fitted with a lid in accordance with the invention shown in the locking position.

FIGS. 1 to 5 show a pressure cooking appliance in accordance with the invention, such as a pressure cooker, of the type comprising a pressure cooker with jaws for cooking food under steam pressure. In conventional manner, the pressure cooker 1 shown in FIG. 1 comprises a metal vessel 2 of circular or oval section, for example, terminating at its top end by a rolled and folded oval rim 3 (FIG. 5). The pressure cooker 1 also comprises a lid 4 for placing and positioning on the cooking vessel 2 in leaktight manner, so as to create a hermetically-closed enclosure within which it is possible to obtain an operating pressure higher than atmospheric pressure by supplying heat.

The pressure cooker of the invention is provided with the sealing elements needed to enable pressure to be raised, such as an annular gasket (not shown in the figures), and with all the necessary safety devices against excess pressure (not shown in the figures), such as safety valves and gasket creep systems, so as to ensure that the normal operating pressure is not exceeded accidentally. Such elements and devices are well known to the person skilled in the art and they do not form part of the present invention, so they are consequently not described in greater detail herein.

Figure 1:
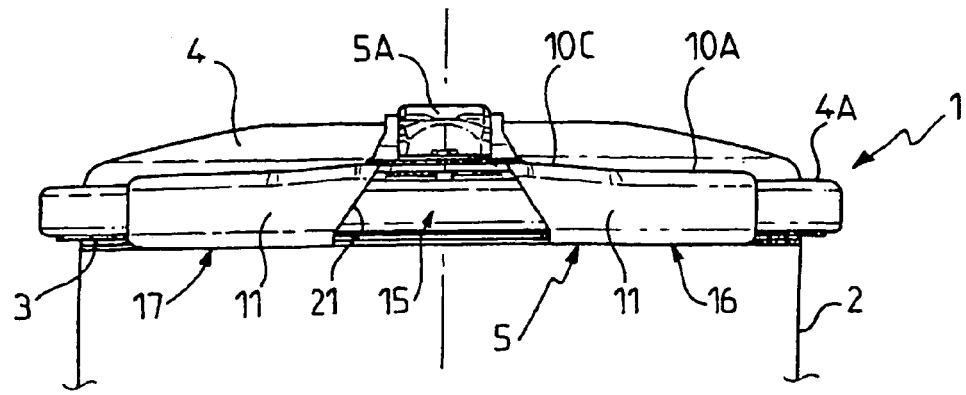
FIG. 1 is a side view of a pressure cooker in accordance with the invention and fitted with a lid provided with locking jaws in accordance with the invention.
Figure 2:
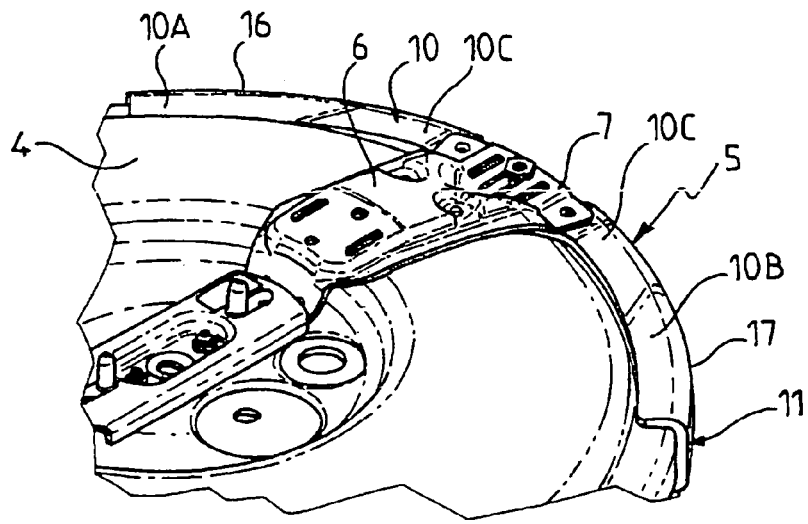
FIG. 2 is a fragmentary perspective view showing a detail of how jaws in accordance with the invention are mounted on a lid in accordance with the invention.

As shown in particular in FIGS. 1 and 2, the lid 4 has at least one jaw 5 mounted to move radially relative to the main axis of symmetry of the pressure cooker 1 shown in FIG. 1, between a locking position shown in FIG. 5, and an unlocking position shown in dashed lines, also in FIG. 5. Axial displacement of the jaw(s) 5 is provided by means of a control system 5A including a drive arm 6 secured at one end to the jaw 5 that is associated therewith, and secured at its other end (not shown in the figures) to a control member, such as a button, knob, handle, or the like for being actuated by the user in order to extend or retract the jaws radially, corresponding respectively to the unlocking position and to the locking position. Since such devices are also well known to the person skilled in the art, they are not described in greater detail herein.

As can be seen in FIGS. 1 to 4, the jaw 5 is curved, and its curvature matches and is complementary to the curvature of the lid 4 and the vessel 2, so as to provide proper locking of the lid on the vessel. The jaw 5 extends over a defined peripheral length which is specific to each pressure cooker as a function of its size, and for example over a peripheral length corresponding to one-third, one-fourth, or one-fifth of its circumference.

The jaw 5 is substantially of channel section, defining a top face 10 for bearing on the lid 4, and in particular on its outer annular surface 4A, a front face 11 forming the web of the channel section, and a folded-under bottom face 12 for coming into contact with and for bearing against the underside of the outwardly-extending rim 3 of the vessel, when the jaw is in the locking position (FIG. 5).

According to an important characteristic of the invention, the jaw of the invention has a recess or setback 15 that is substantially central relative to the axis of symmetry YY' of the jaw 5, and occupying the front face 11 and the bottom face 12 so as to define two locking wings 16 and 17 situated on either side of the setback 15 and symmetrical to each other. By means of this disposition, a jaw 5 is obtained having two locking wings 16, 17 that bear against the folded-over rim 3 of the vessel in the side and end zones of the jaw 5. This configuration makes it possible to save material in the central portion of the jaw 5 because of the setback 15, thereby constituting a non-negligible saving in material, while also retaining good robustness and good ability of the jaw to withstand deformation. Furthermore, this disposition makes it possible to shape the jaw by means of a folding technique, which avoids any need to resort to a stamping technique. Finishing operations are thus greatly reduced or even non-existent, since the stresses and mechanical damage to which the material is subjected during folding are much smaller, which makes it possible to avoid any need to resort to subsequent specific operations of polishing and finishing.

Figure 3:
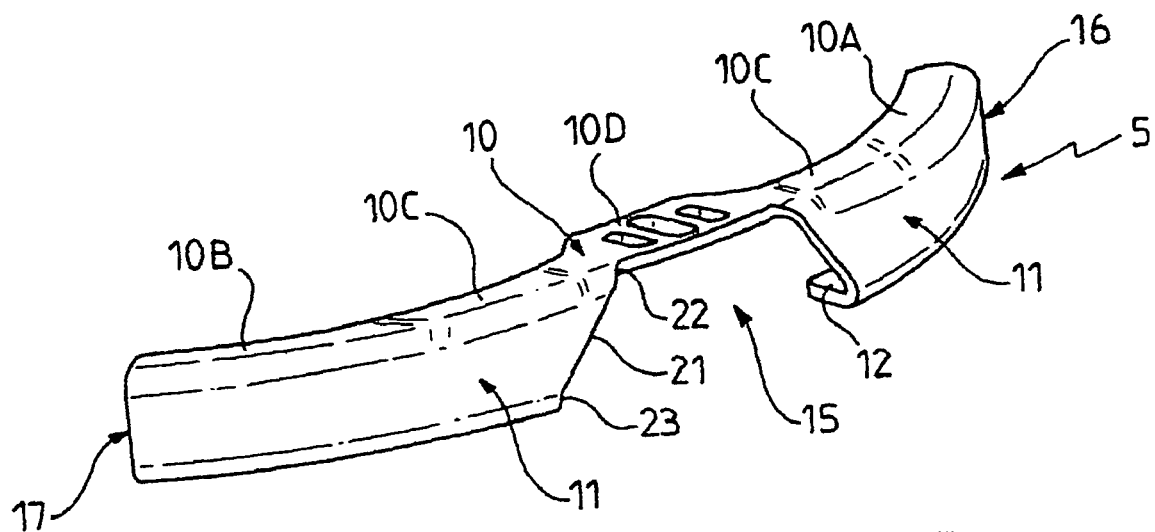
FIG. 3 is a perspective view of a locking jaw in accordance with the invention for mounting on a lid in accordance with the invention.

As shown more particularly in FIGS. 3 and 4, the top bearing face 10 comprises or is formed by two lateral top faces 10A, 10B situated respectively in each of the locking wings 16 and 17, each of said lateral top faces 10A and 10B being connected via a respective connection face 10C to a central top face 10D situated in the central setback 15, said central top face 10D being raised relative to the two lateral top faces 10A and 10B.

Because of the presence of a central zone that is raised relative to the lateral top faces 10B and to the associated connection faces 10C, specifically in register with and in the central recess or setback 15, deformation of the lid within the jaw itself is balanced in the event of the entire assembly being deformed due to an accidental and uncontrolled rise in pressure. This disposition serves to balance in optimum manner any accidental deformation which may arise in the pressure cooker in the event of failure in the safety devices of the pressure cooker.

Advantageously, the connection faces 10C are connected, as shown, progressively from the lateral top faces 10A and 10B to the central top face 10D.

Advantageously, and as shown in FIG. 4, for example, the progressive connection via the connection faces 10C takes place via two opposite connection radii of values R1 and R2 lying in the range about 10 millimeters (mm) to about 40 mm, leading respectively to the lateral top faces 10A, 10B and to the central top face 10D. This contributes to increasing continuity and strength in the top zone of the jaw 5, while making the folding operation a great deal easier when forming the front faces 11 and the folded-under bottom face 12. Advantageously, the radii R1 and R2 are respectively equal to 27 mm and to 20 mm.

As shown in FIG. 4 in particular, the lateral top faces 10A, 10B slope at a angle α relative to the horizontal or to the plane surface of the folded-over rim 3, where the value of said angle α is oriented in such a manner that it is the outer portions 20 of said faces, furthest from the axis of symmetry YY' of the jaw, that bear against the lid 4. By means of this angle of inclination of each lateral top face 10A, 10B, an inclined zone P is defined (FIG. 4) which, in its rest position, bears against the annular surface 4A of the lid only in its outermost portion 20. In the event of deformation, any relative deformation between the lid 4 and the jaw 5 is thus under better control, since the zones of the bearing points 20 between the jaws and the lid are offset into the outer lateral portions of the jaws.

Advantageously, the angle of inclination α of the lateral top faces 10A and 10B lies in the range 0.5° to 1.5°. In particularly preferred manner, the lateral top faces 10A, 10B are substantially plane.

In the invention, each of the two locking wings 16, 17 has a folded-under bottom face 12 that is substantially plane in its circumferential extent so as to define an elongate bearing zone Z extending over substantially the entire extent of the folded-under bottom faces 12. Since the folded-under bottom faces 12 are preferably parallel to the folded-out rim 3 of the vessel, this provides a good distribution of bearing forces, thus avoiding any problems of localized deformation.

In combination with the characteristic concerning the angle of inclination α, the elongate bearing zone Z between the vessel 2 and the folded-under bottom faces 12 makes it possible to deal with deformation of the lid 4 in optimum manner, by allowing localized deformation of the lid 4 in its zone situated in register with the recess 15 and in its adjacent portions where clearance is present. This is made possible by the combination for each jaw 5 of two spot bearing points 20 that are externally positioned against the lid 4 and two elongate bearing zones Z that are likewise externally positioned and that act against the rim 3 of the vessel 2. This geometrical configuration of the bearing surfaces serves to deal with deformation of the lid in optimum and reliable manner and serves to constrain such deformation to take place in the recess 15. Consequently, there is likewise reduced deformation in sectors lying away from the jaws 5.

Advantageously, when the lid 4 is circular, each curved jaw 5 occupies an arc that is long enough to define a corresponding angle at the center that is equal to or greater than 90°.

As shown in FIGS. 1, 3, and 4, the front face 11 connecting the bottom faces 12 of the wings 16, 17, the central top face 10D terminates towards the setback 5 by means of a sloping edge 21. Advantageously, the sloping edge 21 is oriented in such a manner that its top end 22 is closer to the axis of symmetry YY' of the jaw 5 than is its bottom end 23.

Advantageously, each of the two locking wings 16, 17 has a front face 11 which is connected to the central top face 10D via the sloping edge 21 between R1 and R2, or preferably beyond the connection radius R2, i.e. the front face rises to the level of said central top face 10D. This provides better strength and better ability to deal with any deformation of the jaw 5 by avoiding possible deformation at the connection radius R1 and by avoiding any fold starters.

The pressure cooker 1 in accordance with the invention as described above may have a single jaw 5 associated with some other device for fixing the lid on the vessel, e.g. by rotation.

Nevertheless, in preferred manner, the lid in accordance with the invention is fitted with two jaws 5 that are disposed radially opposite each other on the lid 4, it being understood that in the meaning of the invention, a lid in accordance with the invention could have two, or four, or an even larger number of jaws 5 without thereby going beyond the ambit of the invention.

The invention also seeks to protect the entire pressurized cooking appliance of the pressure cooker type that is fitted with a lid presenting at least one jaw as described above.

The technical characteristics relating to the jaws, and the way in which they co-operate with the lid and the vessel, make the jaws simpler to manufacture while obtaining as an end product a lid that is easy to handle and light in weight, and obtaining a pressure cooker with improved operating safety in the event of an accidental rise in pressure, since any deformation is limited and kept under control.

SUSCEPTIBILITY OF INDUSTRIAL APPLICATION

The industrial application of the invention lies in designing and manufacturing lids and pressurized cooking appliances, and in particular pressure cookers having jaws.

The invention claimed is:

1. A lid (4) for a pressure cooking appliance (1), the lid designed to be placed and locked on a cooking vessel (2), said lid (4) comprising:
   at least one jaw (5) mounted to move radially between a locking position and unlocking position, said at least one jaw (5) being substantially of channel section, with a top face (10) for bearing on the lid (4), a front face (11), and a folded-under bottom face (12) designed, when in the locking position, to come into contact with the underside of a rim (3) of the cooking vessel (2);
   wherein said at least one jaw (5) includes a substantially central setback (15) extending in the front and bottom faces (11, 12) thereof so as to define two locking wings (16, 17).

2. The lid according to claim 1, wherein the top bearing face (10) comprises two lateral top faces (10A, 10B) situated in the locking wings (16, 17), each of said lateral top faces (10A, 10B) being connected via an associated connection face (10C) to a central top face (10D) situated in register with the central setback (15), said central top face (10D) being raised relative to the two lateral top faces (10A, 10B).

3. The lid according to claim 2, wherein the connection face (10C) connects progressively firstly to the lateral top faces (10A, 10B), and secondly to the central top face (10D).

4. The lid according to claim 3, wherein the progressive connection of the connection face (10C) takes place via two opposite connection radii of values R1 and R2 lying in the range 10 mm to 40 mm and leading respectively to the lateral top faces (10A, 10B) and to the central top face (10D).

5. The lid according to claim 2, wherein the lateral top faces (10A, 10B) slope at an angle α relative to the horizontal, the slope being oriented in such a manner that the outermost portions (20) of said faces furthest from the axis of symmetry YY' of the jaw (5) bear against the lid (4).

6. The lid according to claim 5, wherein the angle of inclination α of the lateral top faces (10A, 10B) lies in the range 0.5° to 1.5°.

7. The lid according to claim 1, wherein each of the two locking wings (16, 17) includes a bottom face (12) that is folded under and substantially planar.

8. The lid according to claim 4, wherein the front face (11) connecting the bottom face (12) of each wing (16, 17) to the central top face (10D) terminates towards the setback (15) in an inclined edge (21) whose top end (22) is closer to the axis of symmetry (YY') of the jaw (5) than is its bottom end (23).

9. The lid according to claim 8, wherein each of the two locking wings (16, 17) has a front face (11) which connects with the connection face (10C) or the central top face (10D), at the level of the central top face.

10. The lid according to claim 1, further comprising two radially-opposite jaws (5).

11. The lid according to claim 1, wherein the lid (4) is circular and each jaw (5) defines a circular arc subtending an angle at the center that is equal to or greater than 90°.

12. A pressure cooking appliance comprising:
a cooking vessel; and
a lid configured to be placed and locked on the cooking vessel, the lid comprising:
at least one jaw mounted to move radially between a locked position and an unlocked position, the at least one jaw being substantially of channel section and having a top face for bearing on the lid, a front face, and a folded-under bottom face designed, when in the locked position, to come into contact with the underside of a rim of the cooking vessel, the at least one jaw further including a substantially central setback extending in the front and bottom faces thereof so as to define two locking wings.

* * * * *